United States Patent
Sumiyoshi et al.

[15] 3,640,151
[45] Feb. 8, 1972

[54] DEVICE FOR CONTROLLING IN A STEPWISE MANNER HYDRAULIC PRESSURE OF WORKING OIL FOR USE WITH AN AUTOMATIC TRANSMISSION HAVING A TORQUE-CONVERTER

[72] Inventors: Masaharu Sumiyoshi, Toyota; Shigeru Sakakibara, Chita-gun; Osamu Ito, Toyota; Takaaki Kato, Toyohashi, all of Japan

[73] Assignees: Toyota Jidosha Kogyo Kabushiki Kaisha, Toyota-shi; Nippondenso Kabushiki Kaisha, Kariya-shi, Japan

[22] Filed: Apr. 22, 1970

[21] Appl. No.: 30,871

[30] Foreign Application Priority Data

June 3, 1969 Japan..................................44/43886
June 4, 1969 Japan..................................44/43827

[52] U.S. Cl..................................74/731, 60/54
[51] Int. Cl..................................F16h 27/00
[58] Field of Search..................................60/54; 74/731

[56] References Cited
UNITED STATES PATENTS

2,484,011 10/1949 Brunken et al. ....................74/731
2,913,931 11/1959 Hilpert..................................74/731
3,007,351 11/1961 Hilpert..................................74/731 X
3,212,360 10/1965 Fisher et al. ..........................60/54 X

*Primary Examiner*—Edgar W. Geoghegan
*Attorney*—Cushman, Darby & Cushman

[57] ABSTRACT

A device for step controlling the hydraulic pressure of working oil for an automatic transmission having a torque-converter comprising means for generating a signal representative of a slip ratio between speeds of a turbine and pump of the torque-converter, first valve means actuated by said signal so as to be opened or closed thereby varying the working oil pressure and second valve means actuated by the oil discharged from said first valve means for setting a predetermined pressure in response to said ratio depending upon whether it is higher or lower than at least two predetermined points, thereby reducing in a stepwise manner the pressure of working oil acting upon friction engaging means of the torque-converter when said ratio is increased whereby the working oil pressure can be suitably controlled in response to a desired torque transmission by the torque-converter.

4 Claims, 8 Drawing Figures

DEVICE FOR CONTROLLING IN A STEPWISE MANNER HYDRAULIC PRESSURE OF WORKING OIL FOR USE WITH AN AUTOMATIC TRANSMISSION HAVING A TORQUE-CONVERTER

BACKGROUND OF THE INVENTION

The present invention relates to a device for controlling in a stepwise manner the hydraulic pressure of working oil for improving shifts from one gear ratio to another ratio in an automatic transmission with a torque-converter.

In the conventional automatic transmission with a torque-converter, the force is transmitted and wasted like impact when there exists a large torque difference between the torque produced by the engine and the inertia torque of the vehicle when shifts occur, so that the vehicle is forced to accelerate or decelerate within a very short time.

One conventional method to eliminate the above-described defects, varies the hydraulic pressure of working oil used for controlling the shifts by a hydraulic controlling circuit complex in construction. For example, a throttle valve is used in order to vary the hydraulic pressure of working oil in response to a degree of depression of an accelerator pedal. Alternatively, a governor valve is used in order to vary the hydraulic pressure of working oil in response to the speed. In response to the working oil under pressure from these valves, a hydraulic pressure of working oil set by a constant pressure valve is varied to a suitable value, but it is exceedingly difficult to cause the shift from one gear ratio to another over a wide range of torques of the engine and the load without causing any transmission impact. A hydraulic pressure control circuit means complex in construction for controlling the hydraulic pressure of the working oil must be incorporated in a transmission so that the transmission becomes very bulky, heavy in weight and not suited for mounting upon, especially, a compact car. The prime cause of these defects and problems is due to the fact that the hydraulic pressure of the working oil is not controlled in response to a degree of torque transmission between the engine and the load.

SUMMARY OF THE INVENTION

In view of the above, the broad object of the present invention is to eliminate the above-described defects and problems and to prevent the impactlike torque variation when the shifts occur.

It is another object of the present invention to provide a device for controlling the hydraulic pressure of working oil for use in an automatic transmission having a torque-converter which device can control the hydraulic pressure of working oil in response to a slip ratio which is associated with a magnitude of torque to be transmitted by the torque-converter. In this disclosure, the term slip ratio is a ratio between the speeds of the torque-converter turbine and pump, that is $N_2/N_1$ where $N_1$ is the speed of the pump and $N_2$, the speed of the turbine.

It is a further object of the present invention to provide a device of the character described above which can reduce the hydraulic pressure of working oil in a stepwise manner when the slip ratio reaches at least one predetermined point.

It is a further object of the present invention to provide a device of the character described above having at least one slip ratio setting circuit imparted with a hysteresis characteristic in order to prevent the variation in hydraulic pressure of working oil due to the transient variation in slip ratio caused by the shifts when the hydraulic pressure of working oil is controlled in response to a slip ratio adjacent to the slip ratio at which the shift from one gear ratio to a next lower ratio occurs or in response to a signal representative of this slip ratio.

In the present invention, at least more than one slip ratios can be employed as the slip ratios at which the shifts occur in the transmission.

According to the present invention, when the so-called engine brake is applied so that a slip ratio becomes in excess of unity, the working oil supplied to the torque-converter has the minimum working pressure but sufficient enough to effect the torque transmission by the torque-converter.

The above and other objects, features and advantages of the present invention will become more apparent from the following description of one illustrative embodiment thereof taken in conjunction with the accompanying drawing.

DESCRIPTION OF THE PREFERRED EMBODIMENT

Figure 1:
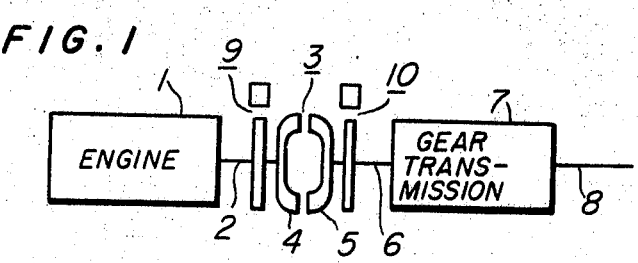
FIG. 1 is a diagrammatic view of an automatic transmission with a torque-converter to which is applied the present invention.

Referring to FIG. 1, a driving shaft 2 of an engine 1 is connected to a torque-converter pump 4 of a torque-converter generally designated by 3. A torque-converter turbine 5 is connected to a gear transmission 7 through a turbine output shaft 6. As is well known in the art the gear transmission 7 comprises a gear train and frictional engagement means actuated by hydraulic pressure supplied from a hydraulic pressure source through a hydraulic circuit (not shown). A transmission output shaft 8 transmits torque to drive wheels not shown. A tachometer 9 for detecting the r.p.m. of the engine 1 is coupled to the driving shaft 2 while a tachometer 10 for detecting the r.p.m. of the torque-converter turbine 5 is coupled to the turbine output shaft 6.

Figure 2:
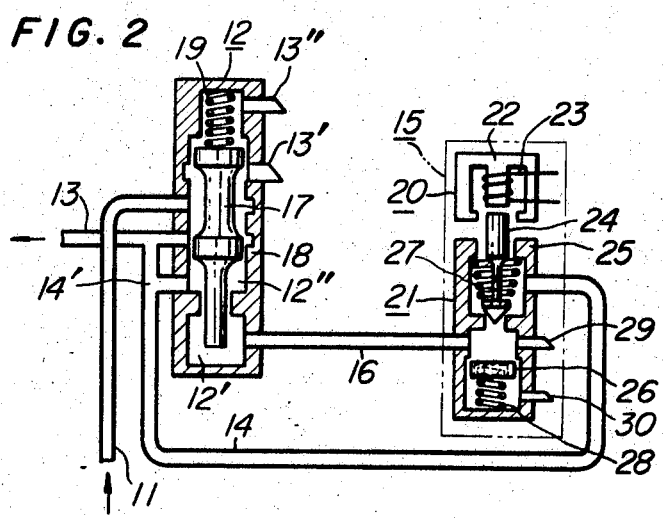
FIG. 2 is a hydraulic pressure circuit diagram of one embodiment of the present invention for controlling the hydraulic pressure of working oil.

In FIG. 2, the working oil under pressure supplied from a hydraulic pressure source such as a gear pump (not shown) driven by the driving shaft 2 is directed toward a constant pressure valve 12 through a hydraulic circuit 11 and thereafter is discharged into the frictional engagement means of the gear transmission 7 in FIG. 1 through an oil passage 13 and through a hydraulic circuit not shown.

The working oil under pressure from the circuit 11 is also directed toward a pressure valve 15 through a branch 14 and thereafter into a lower chamber 12' of the constant pressure valve 12 and then through an oil passage 16, thereby varying a magnitude of the hydraulic pressure set at the constant pressure valve 12. The constant pressure valve 12 comprises a valve stem 17, a valve body 18 and a spring 19. The working oil under pressure is admitted into the constant pressure valve 12 from the circuit 11 and passes through the space between the valve stem 17 and the valve body 18 and discharged from the oil passage 13. A fraction of the working oil under pressure admitted into the constant pressure valve 12 is discharged into a drain 13'. In order to facilitate the movement of the valve stem 17, a drain 13'' is provided. A fraction of the working oil under pressure discharged from the constant pressure valve 12 into the oil passage 13 is admitted through an oil passage 14' into the lower chamber 12'' of the constant pressure valve 12, thereby forcing upwardly the valve stem 17 against the spring 19 so as to constrict the oil discharged through the oil passage 13. Therefore, the pressure of the working oil (working pressure) is reduced and maintained at a constant pressure at which the force of the spring forcing the valve stem 17 downwardly is in equilibrium with the force of the working pressure within the lower chamber 12'' forcing the valve stem 17 upwardly. When the working oil under pressure is not admitted into the lower chamber 12', the constant pressure valve 12 so controls the working oil under pressure as to be 10 atm. in this embodiment.

The pressure valve 15 comprises a solenoid 20 and a valve 21. The solenoid 20 comprises a core 22 and a coil 23 wound therearound so that when the coil 23 is energized, the valve 21 is opened. The valve 21 comprises a valve stem 24, a valve body 25, a damping valve 26 and springs 27 and 28. The valve body 25 is provided with drains 29 and 30 as shown. In the instant embodiment, the valve stem 24 is shown as being a needle valve, but it is seen that the present invention is not limited thereto and that any valve can be employed as needs demand. The valve stem 24 is normally biased downwardly by the spring 27 and the upper portion of the valve stem 24 is used as a moving core or plunger of the solenoid 20. The damping valve 26 is normally biased upwardly by the spring 28 and is adapted to move downwardly against the spring 28 upon admittance of the working oil under pressure into the upper portion of the valve 26. When the admission of the working oil under the pressure is ceased, the valve 26 moves upwardly by the spring 28. The motion of the valve 26 is limited by the drain 30. More specifically, the valve 26 is not actuated or moved when the cycle of the variation in the pressure of the working oil is in excess of a predetermined value. But when the cycle of the variation in the pressure is less than this predetermined value, the valve 26 is actuated in response to the variation in pressure of the working oil so as to eliminate this variation so that the working oil under pressure which is stabilized in accordance with a slip ratio may be supplied to the constant pressure valve 12. A fraction of the working oil admitted into the oil passage 16 upon the upward movement of the valve stem 24 is discharged through the drain 29 out of the valve body 25. More specifically, when the valve stem 24 is moved downwardly so as to close the valve, the working oil in the oil passage 16 is discharged through the drain 29 out of the valve body 25 thereby reducing the pressure of the working oil.

By varying suitably a time interval between energization and deenergization of the solenoid 20 and more specifically by varying a ratio of a valve opening time interval to a valve closing time interval, that is a pulse width of pulses applied to the solenoid 20, the hydraulic pressure of the working oil in the oil passage 16 may be varied. Both of the damping valve 26 and the spring 28 serve to smooth out the variation in pressure of working oil.

When the valve stem 24 is in its lowermost position so that the valve 15 remains closed, the hydraulic pressure of the working oil discharged from the oil passage 13 remains at 10 atm. because the working oil does not actuate the constant pressure valve 12. On the other hand, when the valve stem 24 is in its upper position so that the valve 21 is opened, the working oil actuates the constant pressure valve 12 so that the hydraulic pressure of the working oil discharged from the oil passage 13 is reduced to 4 atm. Thus, it is seen that by varying the valve closing-opening time interval ratio of the valve 21, the working oil whose pressure is suitably selected in a range from 10 to 4 atm. may be discharged from the oil passage 13. If required, the damping valve stem 26 and its spring 28 may be eliminated.

Figure 4:
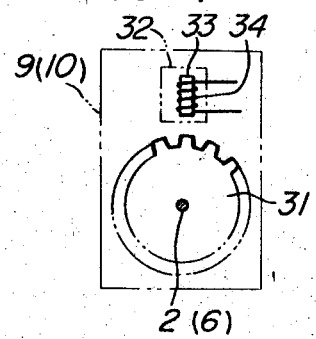
FIG. 4 is a diagrammatic view of a tachometer used in the present invention.

The tachometers 9 and 10 are similar in construction. Referring to FIG. 4, the tachometer 9 or 10 comprises a disk 31 having teeth and coupled to the driving shaft 2 or the output shaft 6 of the turbine 5 and a detector 32. The teeth or the like are formed around the periphery of the disk 31. The detector 32 includes a magnet 33 and a winding 34 wound therearound so that a voltage is induced in the winding 34 by the variation in leaked flux caused when the teeth or ridges of the disk 31 move toward and away from the magnet 33. The induced voltage across the winding 34 is derived as pulse output voltage whose frequency is a product of a number of teeth of the disk 31 multiplied by an r.p.m. of the shaft 2 or 6. The output voltage is shaped by a waveform-shaping circuit not shown and is converted into a DC voltage in proportion to the r.p.m. of the shaft 2 by a frequency-DC voltage converter not shown. Alternatively may be used any other converter such as a DC generator which converts the r.p.m. of the shaft 2 into DC voltage.

Figure 3:
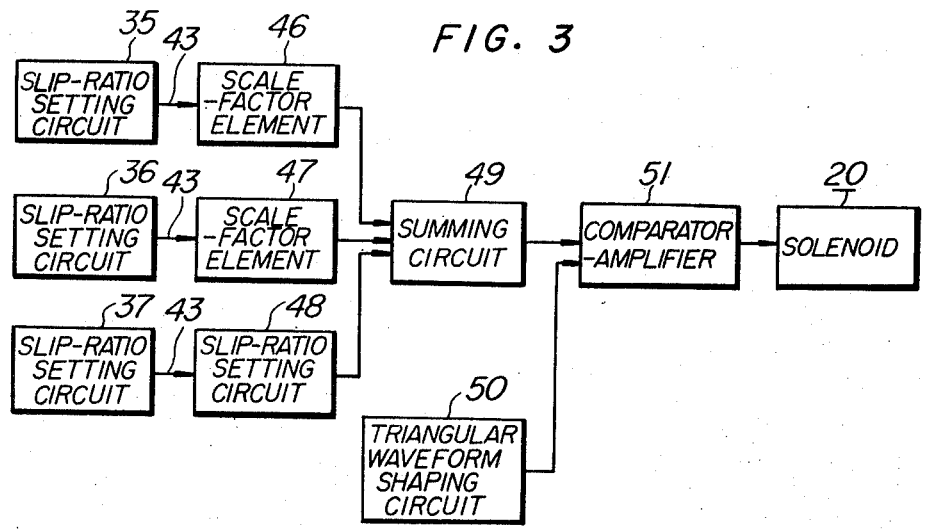
FIG. 3 is a block diagram of an arithmetic operation circuit thereof for controlling in a stepwise manner the hydraulic pressure of working oil.

Thus, the r.p.m. of the driving shaft 2 of the engine 1 and of the output shaft 6 of the torque-converter turbine 5 are converted into DC voltage $N-1$ and $N-2$ respectively. It is noted that a slip ratio is given in the term of $N-2/N-1$. The DC voltages $N-1$ and $N-2$ are applied to slip-ratio setting circuits 35, 36 and 37 of an arithmetic circuit for controlling in a stepwise manner the hydraulic pressure of the working oil shown in FIG. 3.

Figure 7:
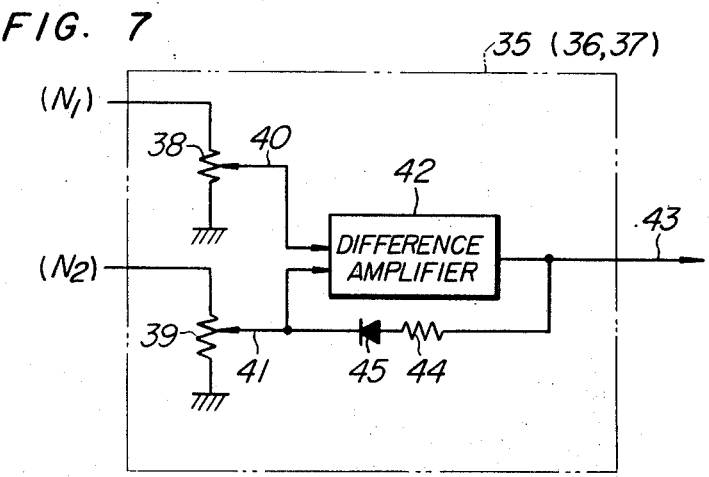
FIG. 7 is a block diagram of one slip ratio setting circuit having a hysteresis characteristic.

The slip-ratio setting circuits 35, 36 and 37 are similar in construction as shown in FIG. 7 and generate the output voltages when a slip-ratio, $N-2/N-1$, is a predetermined value $s$ ( $N-2/N-1$). More specifically, the voltages $N-1$ and $N-2$ which are in proportion to the r.p.m. of the shafts 2 and 6 respectively are applied to potentiometers 38 and 39 respectively and then to a difference amplifier 42 through intermediate terminals 40 and 41.

Assume that the terminal voltage at 40 and 41 be $K_1[N-1]$ and $K_2[N-2]$, where $K_1$ and $K_2$ are coefficients. Then in the difference amplifier generates a predetermined output voltage at an output terminal 43 when $(K_2[N-2]-K_1[N-1])$ is positive. More specifically, the difference amplifier is so arranged that a predetermined output voltage is derived at 43 only when $K_2[N-2]>K_1[N-1]$, so that $[N-2]/[N-1]>K_1/K_2$ is obtained. Thus, when $K_1/K_2$ is so selected as to be a slip ratio, $N-2/N-1>s$ is obtained and the output voltage from the difference amplifier 42 is derived from the output terminal 43.

In the similar manner as described above, when the difference amplifier 42 is so arranged as to generate the output voltage at the terminal 43 when $N-2/N-1<K_1/K_2$, the output voltage from the amplifier 42 is derived from the terminal 43 when $N-2/N-1<s$.

A fraction of the output from the amplifier 42 is returned to the terminal 41 through a series circuit consisting of a resistor 44 and a diode 45, as a feedback signal. That is, a voltage which is the product of the output voltage from the amplifier 42 at the terminal 43 multiplied by a coefficient $K_3$ is applied to the terminal 41 so that the voltage or potential at 41 is increased to $[N-2]K_2K_3$.

Thus, the operation for finding $N-2/N-1>(K_1/K_2)\cdot 1/K_3$ is made in the slip-ratio setting circuit 35 so that the slip ratio is set to a relatively small value. But when the values of $N-1$ and $N-2$ are such that $N-2/N-1<K_1/K_2\times 1/K_3$, no output voltage is derived from the difference amplifier 42 so that the slip ratio is set to the previous slip ratio of $N-2/N-1>K_1/K_2$. That is, the slip ratio setting has a hysteresis characteristic between $K_1/K$ and $K_1/K_2\times 1/K_3$.

In the instant embodiment, assume that the slip ratio setting circuits 35, 36 and 37 are so set as to generate a predetermined output voltage when the slip ratios are in excess of 0.75, 0.9 and 1.05 respectively. Then, when the slip ratios are less than 0.7, 0.85 and 1.00, no output voltages are derived from the slip ratio setting circuits 35, 36 and 37 respectively. The slip ratio of 0.9 is for shifting the gear transmission 7 to a next higher speed while the slip ratio 0.7, for shifting the gear transmission 7 down to a next lower speed. For example, even when the slip ratio transient variation is 0.9±0.04 when the gearshift is made to a next higher speed with the slip ratio of 0.9, the slip-ratio setting circuit 36 continues to generate a predetermined output voltage and never ceases to generate it. On the other hand, when the gearshift is made to a next lower speed with the slip ratio of 0.7 so that there occurs the slip ratio variation between 0.7±0.04, the output voltage from the circuit 35 is not generated and will not be generated. Thus, it is seen that because of the provision of the slip-ratio setting circuits 35, 36 and 37, the output voltages therefrom remain unchanged even when the slip ratios vary so that the stabilized working oil pressure may be obtained.

The output voltages from the slip-ratio setting circuits 35, 36 and 37 are applied to scale-factor elements 46, 47 and 48 so that the output voltages are changed into predetermined values set by the scale-factor elements respectively. Each of these elements may comprise a potentiometer or the like and in the instant embodiment, the output voltages from these elements are 0.3 v., 0.2 v. and 1 v. respectively so that the maximum pressure of the working oil may be adjusted to the pressures 0.7, 0.5 and 0.4 times the maximum pressure when the slip ratios are in excess of 0.75, 0.90 and 1.05 respectively. In other words, in the instant embodiment the maximum pressure of the working oil has been assumed as 10 atm. so that the pressure is reduced to 7 atm., 5 atm. or 4 atm. The output voltages from the elements 46, 47 and 48 are added in a summing circuit 49 which is preferably an amplification circuit having a resistor feedback such as the so-called operational amplifier widely used in an analog computer.

Figure 5:
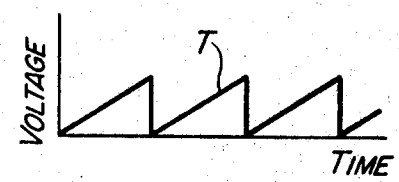
FIG. 5 is a graph illustrating triangular waveform voltage generated by a triangular waveform voltage generating circuit shown in FIG. 3.
Figure 6A:
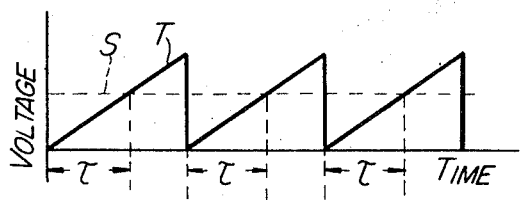
FIG. 6 (FIGS. 6a and 6b) is a graph illustrating the input and output voltages of a comparator-amplifier shown in FIG. 3.
Figure 6B:
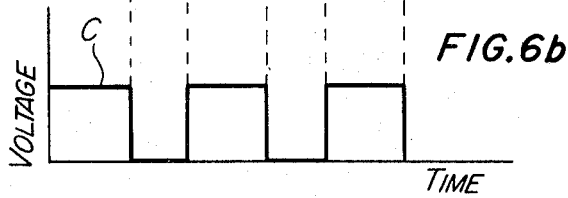

In the instant embodiment, the output voltage from the summing circuit 49 is 0 v. when the slip ratio is less than 0.75, 0.3 v. when the ratio is in excess of 0.75, 0.5 v. (=0.3 $v_r$+0.2 v.) when the ratio is in excess of 0.9 and 0.6 v. (=0.3 v.+0.2 v.+0.1 v.) when the ratio is in excess of 1.05. The output voltage from the circuit 49 is applied to a comparator 51 where the output voltage is compared with an output voltage from a triangular waveform-shaping circuit 50, which generates triangular waveform voltage with a predetermined repetitive cycle and may be any suitable circuit for this purpose. The repetitive cycle is preferably shorter than a response speed, for example 0.5 sec., of the engine. That is, the repetitive cycle is for example 0.05 sec., so that the hydraulic pressure of the working oil may follow to the actuation of the automatic transmission with a torque-converter. The output voltage in triangular waveform from the circuit 50 is shown in FIG. 5 by T. When the voltage T is less than the output voltage S from the summing circuit 49 and more specifically within a time interval $\tau$ in FIG. 6-($a$), the solenoid 20 which is a load of the comparator 51 is energized. The comparator 51 comprises a circuit for generating a predetermined voltage when one of the two inputs is less than the other and a power amplification circuit so that the current flows through the load. Thus, the comparator-amplifier 51 energizes and deenergizes the solenoid 20 at time intervals respectively within the repetitive cycle of the triangular waveform voltage T. In the instant embodiment, as shown in FIG. 5, the crest value of the triangular waveform voltage T generated by the circuit 50 remains constant and this voltage rises along the left side slope. Therefore, the solenoid 20 is energized for a time interval 0.3, 0.5 or 0.6 times the cycle of the voltage T depending upon the output voltage 0.3 v., 0.5 v. or 0.6 v. from the circuit 49, but is deenergized for a time interval 0.7, 0.5 or 0.4 times the cycle of the triangular waveform voltage T. Thus, it is seen that the voltage for energizing the solenoid 20 for a time interval in proportion to an output voltage from the circuit 49 is generated in the comparator-amplifier 51.

The pulselike output voltage whose width varies in response to a slip ratio is derived from the comparator-amplifier 51 and applied to the solenoid 20 so that the pressure valve 15 forces the working oil under pressure into the constant pressure valve 12. The hydraulic pressure of the working oil is in proportion to the pulse width of the output voltage of the comparator-amplifier 51. The working oil admitted into the constant pressure valve 12 actuates the same so that the hydraulic pressure of the working oil discharged from the constant pressure valve 12 is controlled in a stepwise manner at 10 atm., 7 atm., 5 atm. and 4 atm.

In the automatic transmission, for example the shift from one gear ratio to a next lower ratio occurs at a slip ratio of 0.7. According to the present invention, the hydraulic pressure of the working oil is reduced at a slip ratio of 0.75 which is slightly higher than this slip ratio 0.7 and is increased at a slip ratio less than 0.7 so that the hydraulic pressure of the working oil is rapidly increased at the slip ratio of 0.7 at which the shift occurs, whereby the variation in torque due to the shift can be minimized and the undesired slip of the friction engagement means can be also minimized. The shift also occurs at a slip ratio of 0.9 from one ratio to a next higher ratio. According to the present invention, the hydraulic pressure of the working oil at the slip ratio of 0.90 is reduced so that the variation in torque due to the shift can be minimized.

When a slip ratio is in excess of unity, that is when the so-called "engine-brake" is applied, the transmission power of the torque-converter is so small that even a low hydraulic pressure of working oil may be used. That is, when the slip ratio is in excess of 1.0, the hydraulic pressure of working oil is reduced to 4 atm. as described hereinabove so that the working oil having the minimum pressure which will not cause any slippage of the friction engagement means may be supplied thereto.

In the instant embodiment, the slip ratio at which the shift occurs and the slip ratio at which is controlled the hydraulic pressure of working oil have been described as being equal, but the present invention can be applied to the case in which the slip ratio at which shift occurs is different from that at which is controlled the hydraulic pressure. For example, when the shift is to be made from one ratio to a next higher ratio, the hydraulic pressure of the working oil may be reduced before a slip ratio reaches a point at which said shift occurs and thereafter the shift is made, thus ensuring smoother shift. On the other hand, the hydraulic pressure of working oil may be reduced when the slip ratio is larger than that at a point at which the shift occurs, that is after the shift, the more positive and firm engagement by the frictional engaging means can be ensured. Thus, it is seen that the present invention provides a hydraulic pressure of working oil best suited for the operation characteristics of an automatic transmission with a torque-converter.

The major advantages accrued from the present invention are as follows:

1. In an automatic transmission with a torque-converter according to the present invention, the hydraulic pressure of working oil is so controlled as to be reduced in a stepwise manner in response to stepwise increase of slip ratio according to the transmission torque of the torque-converter so that the frictional engaging means will not slip and no impactlike torque variation will occur when the shifts occur. Therefore, the present invention can increase the service life or durability of the transmission and ensure a better riding quality. A pulselike voltage whose pulse width varies in a stepwise manner in response to the increase in slip ratio is applied to one pressure valve so as to provide the working oil with a pressure corresponding to the slip ratio, whereby the pressure set by the constant pressure valve is reduced in a stepwise manner by the working oil. Therefore, a working oil pressure control device best suited for vehicles is provided whose hydraulic circuit is simple in construction and which is compact in size, light in weight and reliable in operation.

2. In the transmission according to the present invention there are provided a plurality of slip-ratio setting circuits each for generating a predetermined output voltage when a slip ratio is in excess of a predetermined value, a plurality of scale-factor elements each for generating an output voltage which is a product of the output voltage from the slip-ratio setting circuit and a predetermined coefficient; a summing circuit for adding the output voltages from the scale-factor elements; and a comparator-amplifier for comparing the output from the summing circuit with an output from a triangular waveform voltage generating circuit, thereby generating an output voltage whose pulse width is determined in response to the output from the summing circuit and used so as to energize a solenoid of a pressure valve by the output of the comparator-amplifier whereby the control of the hydraulic pressure can be made with a higher degree of accuracy. No slippage of the friction engaging means will occur and the hydraulic pressure of working oil may be reduced to such an extent as to minimize the torque variation, so that longer service life of a transmission with a torque-converter may be assured.

According to the transmission of the present invention, the pulselike voltage whose width varies in response to a slip ratio may be produced by the combination of one summing circuit, one triangular waveform voltage generator and one comparator-amplifier even when more than three scale-factor circuits are used so that the electric circuit may be simple in construction and compact in size. Therefore, the transmission in accordance with the present invention is best suited for vehicles.

3. The transmission according to the present invention uses slip-ratio setting circuits each having hysteresis, so that the variation in hydraulic pressure of working oil due to variation in slip ratio when shifts occur can be prevented. Therefore the sudden torque variation can be prevented when shifts occur so that a device for controlling the hydraulic pressure of the working oil in a stepwise manner which can improve the riding quality of an automobile can be provided by a simple circuit.

4. In the device of the present invention, a feedback system is provided between the input and output terminals of a difference amplifier in the slip-ratio setting circuit in order to impart hysteresis characteristics thereto so that more accurate actuation can be ensured as compared with the case employing an electromagnetic relay.

What is claimed is:

1. A device for controlling in a stepwise manner the hydraulic pressure of working oil for use with an automatic transmission comprising a torque-converter having a pump and a turbine, a gear transmission having friction engaging means and hydraulic circuit means for controlling said friction engaging means, said device being characterized by means for generating a pulselike output voltage whose pulse width varies in discrete steps in response to different predetermined slip ratios between said turbine and said pump;

a pressure valve comprising a solenoid which is energized by said output voltage and a valve which is opened and closed by said solenoid, thereby varying the pressure of working oil; and a constant pressure valve for varying a hydraulic pressure setting value in response to the pressure of the oil from said pressure valve, thereby reducing in a stepwise manner the hydraulic pressure of the working oil in said hydraulic circuit means with increase in said slip ratio.

2. A device as claimed in claim 1 wherein said pulselike output voltage generating means comprises a plurality of slip-ratio setting circuits each generating a predetermined voltage when a slip ratio is in excess of a predetermined value, a plurality of scale-factor elements for changing said output voltages from said slip-ratio setting circuits to voltages corresponding to the slip ratio, a summing circuit for adding the outputs from said plurality of scale-factor elements, and a comparator-amplifier means for comparing said output from said summing circuit with an output voltage from a triangular waveform voltage generating circuit, thereby generating an output voltage whose pulse width is determined in response to said output voltage from said summing circuit.

3. A device as claimed in claim 1 wherein said pulselike output voltage generating means comprises means for providing a hysteresis characteristic in variation of the pulse width in response to said slip-ratio.

4. A device as claimed in claim 1 wherein said pulselike output voltage generating means comprises a plurality of slip-ratio setting circuits each comprising two potentiometers to which are applied voltages representative of the rotational speeds of said pump and said turbine respectively, a differential amplifier means adapted to generate an output voltage in response to the voltages of said potentiometers and a feedback circuit for transmitting the output voltage of said differential amplifier means to one of said two potentiometers, thereby imparting a hysteresis characteristic to each of said slip-ratio setting circuits and generating a predetermined voltage when the slip ratio is in excess of a predetermined value, a plurality of scale-factor elements for changing said output voltages from said slip-ratio setting circuits to voltages corresponding to the slip ratio, a summing circuit for adding the outputs from said plurality of scale-factor elements and a comparator-amplifier means for comparing said output from said summing circuit with an output voltage from a triangular waveform voltage generating circuit, thereby generating an output voltage whose pulse width is determined in response to said output voltage from said summing circuit.

* * * * *